ns patent office 2,831,002
Patented Apr. 15, 1958

2,831,002

Δ4,9(11)-PREGNADIENES

Seymour Bernstein, Pearl River, N. Y., and Robert H. Lenhard, Ridgefield Park, N. J., assignors to American Cyanamid Company, New York, N. Y., a corporation of Maine No Drawing. Application December 3, 1956
Serial No. 625,606

6 Claims. (Cl. 260—397.45)

This invention relates to new steroid compounds. More particularly, it relates to $\Delta^{4,9(11)}$-pregnadienes and method of preparing the same.

The new compounds of the present invention may be illustrated by the following general formula:

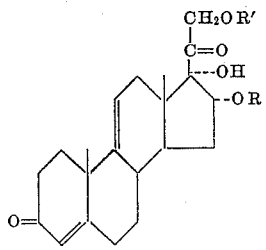

in which R is hydrogen or a lower alkanoyl radical and R' is a lower alkanoyl radical.

The present application is a continuation-in-part of our copending application, Serial No. 519,248, filed June 30, 1955, now Patent No. 2,773,058.

The compounds of the present invention are relatively high melting crystalline solids. They are soluble in the common organic solvents and relatively insoluble in water.

The compounds of the present invention are prepared from a 21-lower alkanoic acid ester of $\Delta^{4,9(11),16}$-pregnatriene-21-ol-3,20-dione, which is treated with osmium tetroxide in an organic solvent, such as benzene, xylene, toluene, etc., in the presence of a tertiary amine, such as pyridine. The corresponding osmate ester is formed, which ester is then decomposed by water and an organic solvent under alkaline conditions. The organic solvent can be those mentioned above and the alkaline conditions can be produced by the addition of potassium bicarbonate, sodium bicarbonate, sodium hydroxide, potassium hydroxide, etc. to the reaction mixture. The product obtained is a 21-lower alkanoic acid ester of $\Delta^{4,9(11)}$-pregnadiene-16α,17α,21-triol-3,20-dione. The latter product when treated with a lower alkanoic acid anhydride produces a 16α,21-di-lower alkanoic acid ester of $\Delta^{4,9(11)}$-pregnadiene-16α,17α,21-triol-3,20-dione.

The present compounds are useful as intermediates in the preparation of the compounds described in our copending application, Serial No. 519,248, filed June 30, 1955. Furthermore, the compounds described in the latter application are convertible to steroids having high physiological activity. This activity reaches, and in many instances exceeds, that of cortisone and hydrocortisone without the undesirable side effects.

The following examples describe in detail the preparation of $\Delta^{4,9(11)}$-pregnadiene-3,20-diones of the present invention:

Example 1

A solution of 0.70 g. of $\Delta^{4,9(11),16}$-pregnatriene-21-ol-3,20-dione 21-acetate and 0.50 g. of osmium tetroxide in 10 ml. of benzene and 0.5 ml. of pyridine was allowed to stand at room temperature for 18 hours. The osmate ester was decomposed by the addition of 35 ml. of water, 10 ml. of benzene, 23 ml. of methanol and 3.58 g. each of sodium sulfite and potassium bicarbonate. After stirring the mixture for 5 hours, approximately 150 ml. of chloroform was added and the stirring continued for ½ hour. The mixture was filtered through diatomaceous earth, the residue washed with hot chloroform and the organic layer separated. The aqueous phase was extracted several times with chloroform and the combined extracts were washed with saturated saline and with water. The dried extract was evaporated under reduced pressure and the residue crystallized from acetone-petroleum ether to give 0.62 g. of crude product, melting point 172–174° with previous softening. Three recrystallizations from acetone-petroleum ether gave 0.42 g. of pure $\Delta^{4,9(11)}$-pregnadiene-16α,17α,21-triol-3,20-dione 21-acetate, melting point 195–197.5° with previous softening. One additional recrystallization did not alter the melting point;

$\lambda_{max.}^{abs.\ alc.}$ 238.5 m$\mu$ ($\epsilon$ 16,700); $[\alpha]_D^{25} + 93°$ (chloroform)

Analysis.—Calcd. for $C_{23}H_{30}O_6$: C, 68.63; H, 7.51. Found: C, 68.72; H, 7.79.

Example 2

To a solution of 325 mg. of $\Delta^{4,9(11)}$-pregnadiene-16α,17α,21-triol-3,20-dione 21 acetate in 20 ml. of pyridine was added 2 ml. of acetic anhydride, and the mixture was allowed to stand at room temperature for 3 days. The solution was poured into water, cooled and the product was filtered and washed with water to give 0.33 g. of pure $\Delta^{4,9(11)}$-pregnadiene-16,17,21-triol-3,20-dione 16α,21-diacetate, melting point 193–195° with previous softening. Two crystallizations from acetone-petroleum ether gave 0.28 g. of pure diacetate, melting point 194–195° with previous softening;

$\lambda_{max.}^{abs.\ alc.}$ 238–239 m$\mu$ ($\epsilon$ 17,400); $[\alpha]_D^{25} + 43°$ (chloroform)

Analysis.—Calcd. for $C_{25}H_{32}O_7$: C, 67.55; H, 7.26. Found: C, 67.31; H, 7.49.

Example 3

27.0 g. of $\Delta^{4,9(11),16}$-pregnatriene-21-ol-3,20-dione 21 acetate was dissolved in 800 ml. of benzene and 15 ml. of pyridine. The osmium tetroxide (20 g.) in 300 ml. of benzene was added with stirring to the steroid mixture over the course of about ½ hour. Stirring was continued for several hours and the mixture allowed to stand over night. To the mixture was added 950 ml. of methanol followed by a solution of 135 g. sodium sulfite and 135 g. of potassium bicarbonate in 1400 ml. of water and the mixture allowed to stir for 7–8 hours. About 1 liter of chloroform was added and the mixture stirred for an additional hour and then allowed to stand over night. The reaction mixture was filtered through a sintered glass funnel, the organic layer separated and the aqueous layer extracted 4–5 times with chloroform. The filter cake was extracted several times with hot chloroform, all organic extracts combined, washed twice with water and dried over magnesium sulfate-activated charcoal. After filtration, it was evaporated to dryness under reduced pressure and the residue crystallized from acetone to yield 15.2 g. (gray solid) of $\Delta^{4,9(11)}$-pregnadiene-16α,17α,21-triol-3,20-dione 21-acetate.

Example 4

To 15.5 g. of $\Delta^{4,9(11)}$-pregnadiene-16α,17α,21-triol-3,20-dione 21 acetate in 550 ml. of pyridine was added 18 ml. of acetic anhydride and the mixture allowed to stand overnight. Methanol was added and the solution evaporated to dryness under reduced pressure. Crystallization of the residue from acetone-petroleum ether (B. P. 60–70°) gave 15.4 g. of $\Delta^{4,9(11)}$-pregnadiene-16α,17α,21-triol-3,20-dione 16α,21-diacetate, melting point 191–194° C.

We claim:

1. Compounds having the general formula

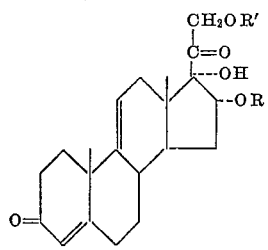

in which R is a member of the group consisting of hydrogen and lower alkanoyl radicals and R' is a lower alkanoyl radical.

2. The compound $\Delta^{4,9(11)}$-pregnadiene-16α,17α,21-triol-3,20-dione 21-acetate.

3. The compound $\Delta^{4,9(11)}$-pregnadiene-16α,17α,21-triol-3,20-dione 16α,21-diacetate.

4. A process which comprises reacting a 21-lower alkanoic acid ester of $\Delta^{4,9(11),16}$-pregnatriene-21-ol-3,20-dione with osmium tetroxide in an organic solvent and a tertiary amine, decomposing the osmate ester so obtained by the addition of water and an organic solvent under alkaline conditions, and recovering a 21-lower alkanoic acid ester of $\Delta^{4,9(11)}$-pregnadiene-16α,17α,21-triol-3,20-dione therefrom.

5. A process which comprises reacting $\Delta^{4,9(11),16}$-pregnatriene-21-ol-3,20-dione 21-acetate with osmium tetroxide in the presence of benzene and pyridine, decomposing the osmate ester so obtained by the addition of water and an organic solvent under alkaline conditions and recovering $\Delta^{4,9(11)}$-pregnadiene-16α,17α,21-triol-3,20-dione 21-acetate therefrom.

6. A process which comprises reacting $\Delta^{4,9(11),16}$-pregnatriene-21-ol-3,20-dione 21-acetate with osmium tetroxide in the presence of benzene and pyridine, decomposing the osmate ester so obtained by the addition of water and an organic solvent under alkaline conditions, treating the reaction product with acetic anhydride and recovering $\Delta^{4,9(11)}$-pregnadiene-16α,17α,21-triol-3,20-dione 16α,21-diacetate therefrom.

References Cited in the file of this patent

UNITED STATES PATENTS

| 2,756,179 | Fried et al. | July 24, 1956 |
| 2,773,058 | Bernstein et al. | Dec. 4, 1956 |
| 2,733,080 | Bernstein et al. | Dec. 4, 1956 |